US011015660B2

(12) United States Patent
Gnyp et al.

(10) Patent No.: US 11,015,660 B2
(45) Date of Patent: May 25, 2021

(54) CENTRAL RELEASE MECHANISM FOR A PNEUMATIC CLUTCH ACTUATING MEANS (71) Applicant: FTE automotive GmbH, Ebern (DE)

(72) Inventors: Jan Gnyp, Ebern (DE); Lothar Hein, Neubrunn (DE); Christian Voigt, Ebern (DE); Sueleyman Yildirim, Baunach (DE); Rolf Seidl, Bamberg (DE); Daniel Baiersdorfer, Ebern (DE)

(73) Assignee: FTE automotive GmbH, Ebern (DE)

( * ) Notice: Subject to any disclaimer, the term of this patent is extended or adjusted under 35 U.S.C. 154(b) by 144 days.

(21) Appl. No.: 16/289,832

(22) Filed: Mar. 1, 2019

(65) Prior Publication Data
US 2019/0277348 A1 Sep. 12, 2019

(30) Foreign Application Priority Data

Mar. 6, 2018 (DE) ..................... 10 2018 001 756.8

(51) Int. Cl.
F16D 25/08 (2006.01)
F16D 48/02 (2006.01)
(Continued)

(52) U.S. Cl.
CPC ........... F16D 25/083 (2013.01); F16D 25/02 (2013.01); F16D 25/14 (2013.01); F16D 48/02 (2013.01);
(Continued)

(58) Field of Classification Search
CPC ...... F16D 25/02; F16D 25/082; F16D 25/083; F16D 25/085; F16D 25/086;
(Continued)

(56) References Cited

U.S. PATENT DOCUMENTS

2011/0139571 A1\* 6/2011 Acker ..................... F16D 21/06
192/85.01

FOREIGN PATENT DOCUMENTS

DE 44 22 726 A1 1/1996
DE 10 2004 058 872 A1 6/2006
(Continued)

OTHER PUBLICATIONS

German Office Action dated Oct. 23, 2018 in German Application 10 2018 001 756.8, filed on Mar. 6, 2018 ( with English Translation).

Primary Examiner — David R Morris
Assistant Examiner — Lori Wu
(74) Attorney, Agent, or Firm — Oblon, McClelland, Maier & Neustadt, L.L.P.

(57) ABSTRACT

A central release mechanism for a pneumatic clutch actuating device has a cylinder housing, which, about a central axis, delimits a ring-shaped pressure chamber wherein a ring-shaped piston which can be pneumatically pressurized via the pressure chamber and which is operatively connectable to a clutch is guided so as to be displaceable along the central axis. In the pressure chamber, between the ring-shaped piston and a base of the cylinder housing, a preload spring arrangement braces the ring-shaped piston and the cylinder housing apart from one another. A movement of the ring-shaped piston relative to the cylinder housing is detectable with a sensor arrangement which has a position detector and a position encoder. The preload spring arrangement has a multiplicity of distributed preload springs, angularly spaced apart from one another, about the central axis. Between the preload springs as viewed in a circumferential direction about the central axis, at least a part of the sensor arrangement is arranged in the region of the pressure chamber providing a compact construction.

16 Claims, 5 Drawing Sheets (51) Int. Cl.
*F16D 25/02* (2006.01)
*F16D 125/58* (2012.01)
*F16D 123/00* (2012.01)

(52) U.S. Cl.
CPC .... *F16D 2123/00* (2013.01); *F16D 2125/585* (2013.01); *F16D 2500/1028* (2013.01)

(58) Field of Classification Search
CPC ...... F16D 25/087; F16D 25/088; F16D 25/14; F16D 2500/1028; F16D 2125/585; F16D 2300/18; F16D 48/02; F16D 2123/00
See application file for complete search history.

(56) References Cited

FOREIGN PATENT DOCUMENTS

| | | |
|---|---|---|
| DE | 10 2005 049 056 A1 | 4/2007 |
| DE | 10 2011 009 022 A1 | 7/2011 |
| DE | 10 2011 014 574 A1 | 12/2011 |
| DE | 10 2013 224 295 A1 | 5/2015 |
| DE | 10 2016 000 707 A1 | 7/2017 |
| EP | 0 301 965 B1 | 8/1991 |

\* cited by examiner

CENTRAL RELEASE MECHANISM FOR A PNEUMATIC CLUTCH ACTUATING MEANS

TECHNICAL FIELD

The invention relates to a central release mechanism for a pneumatic clutch actuating means. In particular, the invention relates to a central release mechanism for a pneumatic clutch actuating means in heavy and medium-weight utility vehicles, such as are used in very great numbers in the automotive industry.

PRIOR ART

Automated or automatic clutch systems with wet or dry friction clutches which can be held in an engaged state or closed by spring force for the transmission of torque and which can be moved by means of a pneumatic, hydraulic or electric actuator counter to the spring force into a disengaged or open state in order to interrupt the transmission of torque have long been known. In utility vehicles (heavy goods vehicles, buses) with automated clutch systems ("CBW" ="Clutch By Wire") for relieving the burden on the driver, with automated manual transmissions ("AMT") for automation also of the shift processes or with dual clutch transmissions ("DCT"), use is made, for the clutch actuation, primarily of pneumatic actuators or actuating cylinders with an associated pneumatic switching valve arrangement, because compressed air is available in any case in utility vehicles, and thus both the operating medium and the drive energy for a pneumatic actuator are present and do not need to be made available in some other way.

For an actuating arrangement which is very close to the transmission, which saves space and which exhibits little friction and wear, so-called central release mechanisms are preferably used as pneumatic actuators, the cylinder housing of which central release mechanisms has, in the region of a central axis, a passage for a transmission shaft. Here, a ring-shaped piston which is received in longitudinally displaceable fashion in the cylinder housing and which can be pneumatically pressurized bears a release bearing, by means of which a force can be applied directly to the diaphragm spring tongues of a clutch.

Such central release mechanisms are commonly equipped with a travel sensor in order to detect the axial displacement travel of the ring-shaped piston in the cylinder housing and thus the actuating travel of the clutch. This actuating travel is directly related to the clutch capacity, the transmissible clutch torque, and is thus a central variable for the controllability and shift quality of the transmission of a motor vehicle. For good controllability of the clutch, it is desirable for the closing movement of the clutch as a measure for the clutch capacity (that is to say the transmissible torque) to be determinable as directly as possible, with very high precision and with high resolution.

The document DE 10 2013 224 295 A1 has disclosed a central release mechanism with travel sensing for a pneumatic clutch actuating means, which central release mechanism has a cylinder housing (guide cylinder with running cylinder and outer cylinder in the linguistic usage of this document) which delimits a ring-shaped pressure chamber about a central axis (axis of rotation). In the pressure chamber, a ring-shaped piston (release piston) which can be pneumatically pressurized via the pressure chamber and which is operatively connectable to a clutch is guided so as to be displaceable along the central axis. Furthermore, in the pressure chamber, between the ring-shaped piston and a base of the cylinder housing, there is provided a preload spring arrangement which braces the ring-shaped piston and the cylinder housing apart from one another, which preload spring arrangement comprises a helical compression spring which surrounds the radially inner running cylinder of the cylinder housing. The preload spring arrangement serves, in the installed state of the central release mechanism, to push the release bearing, which is borne by the ring-shaped piston, with a predefined force against the clutch at all times, such that the release bearing runs concomitantly in all operating states, which greatly minimizes the wear thereof. Finally, in the case of this prior art, the displacement or movement of the ring-shaped piston relative to the cylinder housing is detectable by means of a sensor arrangement (travel sensor), which has a position detector and a position encoder.

More specifically, a carrier plate is provided, by means of which the running cylinder and the outer cylinder of the guide cylinder are rigidly connected and by means of which the known central release mechanism can be installed on the vehicle transmission. A ring-shaped dust protection cap which is coupled to the ring-shaped piston is arranged concentrically with respect to the central axis and surrounds the outer cylinder, such that the cylinder housing as a whole is situated radially within the dust protection cap. In the case of this prior art, the position encoder of the sensor arrangement is a permanent magnet and is embedded in a projection of the dust protection cap such that a radially outwardly pointing side of the permanent magnet is exposed and terminates flush with the dust protection cap. By contrast, the position detector of the sensor arrangement, which comprises a sensor housing with a magnetic-field-sensitive sensor, is rigidly connected to the above-mentioned carrier plate by means of a bracket, such that the position detector is arranged radially outside the protective cap, wherein said position detector overlaps the radially outwardly pointing side of the permanent magnet.

The ring-shaped piston, which is displaced during a clutch operation process, concomitantly drives, during its movement, the dust protection cap coupled thereto, such that the stroke of the ring-shaped piston can be inferred from the movement of the permanent magnet embedded in said dust protection cap. Here, it is the intention for the present axial position of the ring-shaped piston to be detected by means of the change, generated by the respective axial position of the permanent magnet, of the magnetic field in the region of the magnetic-field-sensitive sensor.

In this prior art, the projection, which bears the position encoder, of the dust protection cap also serves as part of a rotation prevention means for the dust protection cap. The other part of the rotation prevention means forms a fork-like bracket, which is screwed to the carrier plate such that the projection of the dust protection cap is held between two arms of the bracket and thus prevents a rotation with respect to the carrier plate. The projection of the dust protection cap is furthermore equipped with a groove, in which a web engages which extends away from the ring-shaped piston and which engages around the dust protection cap in the form of an arm. If the web is in engagement with the groove, this coupling forms a rotation prevention means for preventing a rotation of the ring-shaped piston relative to the dust protection cap and, via the latter, relative to the carrier plate. Ultimately, this rotation prevention means serves, during a stroke movement of the ring-shaped piston in the cylinder housing, in particular to ensure as consistent as possible an overlap, as viewed in a circumferential direction, of the position detector, which is fixed with respect to the cylinder housing, with the position encoder on the dust protection cap.

A disadvantage of this prior art is however to be seen in the fact that the sensor arrangement together with the rotation prevention means provided for it takes up a relatively large structural space in particular in a radial direction of the central release mechanism. The available installation space between engine or clutch and transmission is however generally very restricted, such that as compact as possible a construction of the central release mechanism is desirable.

OBJECT

Proceeding from the prior art as per document DE 10 2013 224 295 A1, the invention is based on the object of creating a central release mechanism, which is of the simplest and most inexpensive possible design and which has position sensing, for a pneumatic clutch actuating means, which central release mechanism is, with high accuracy in the detection of the position of the ring-shaped piston relative to the cylinder housing, of very compact construction in particular in a radial direction.

PRESENTATION OF THE INVENTION

Said object is achieved by means of a central release mechanism for a pneumatic clutch actuating means.

In the case of a central release mechanism for a pneumatic clutch actuating means, which central release mechanism has a cylinder housing, which, about a central axis, delimits a ring-shaped pressure chamber in which a ring-shaped piston which can be pneumatically pressurized via the pressure chamber and which is operatively connectable to a clutch is guided so as to be displaceable along the central axis, the movement of which piston relative to the cylinder housing is detectable by means of a sensor arrangement which has a position detector and a position encoder, and in the case of which central release mechanism, in the pressure chamber, between the ring-shaped piston and a base of the cylinder housing, there is provided a preload spring arrangement which braces the ring-shaped piston and the cylinder housing apart from one another; the preload spring arrangement has a multiplicity of preload springs which are distributed, so as to be angularly spaced apart from one another, about the central axis, wherein, between the preload springs as viewed in a circumferential direction about the central axis, at least a part of the sensor arrangement is arranged in the region of the pressure chamber.

By virtue of the fact that the preload spring arrangement has, in the pressure chamber, a multiplicity of preload springs which are angularly spaced apart about the central axis and which have free spaces in between, a structural space is firstly created in the region of the pressure chamber, which structural space can be utilized for accommodating at least a part of the sensor arrangement, in particular of the position detector or of a part thereof. Owing to the radial displacement—in relation to the generic prior art—of the at least one part of the sensor arrangement inwards into said structural space, the central release mechanism according to the invention has an altogether smaller radial structural space requirement. In an axial direction, too, the central release mechanism according to the invention is of particularly compact construction, because the pressure chamber simultaneously functions as an installation space for the at least one part of the sensor arrangement, specifically without losses of pneumatic effective surfaces. At the same time, said part of the sensor arrangement is protected against external influences and damage simply by its positioning in the region of the pressure chamber.

Since at least one part of the sensor arrangement is thus arranged at the radial height of the pressure chamber with respect to the central axis, it is furthermore the case—again compared with the prior art highlighted in the introduction—that the lever arm between the position encoder of the sensor arrangement and the central axis of the cylinder housing is correspondingly shortened. This has the result that, in the event of tilting, owing to radial play, of the ring-shaped piston with respect to the cylinder housing, the position encoder that is suitably connected to the ring-shaped piston is deflected or fluctuates to a lesser extent in relation to the position detector, which is fixed with respect to the cylinder housing. In particular, the tilting-dependent displacement component of the position encoder relative to the position detector in an axial direction, that is to say in a direction parallel to the central axis, is thus reduced. As a result, it is possible by means of the sensor arrangement for the position and the stroke of the ring-shaped piston along the central axis relative to the cylinder housing to also be detected more accurately in relation to the above prior art.

In conjunction with the greater detection accuracy, owing to the position, of the sensor arrangement, a further advantage of the configuration according to the invention of the central release mechanism with position or stroke sensing consists in that the use of a plastics material for the ring-shaped piston is made possible. This is because a temperature-induced and/or pressure-induced expansion of the plastics material and/or any swelling of the plastics material as a result of absorption of moisture and a possibly associated enlargement of the radial play between ring-shaped piston and cylinder housing has a less pronounced effect on the detection accuracy owing to the radial position of the sensor arrangement with the relatively short lever arm with respect to the central axis. If a plastics material is used for the ring-shaped piston, this firstly offers weight advantages, and secondly, the ring-shaped piston can be produced by mass production more inexpensively—in relation to metal or light metal parts machined by cutting—by injection moulding.

The embodiment according to the invention of the central release mechanism with a multiplicity of relatively small preload springs finally also offers the advantage, in relation to the known embodiment discussed in the introduction with one large central helical compression spring, in particular with the use of a sensor arrangement which operates in accordance with the Hall principle, of a minimized ferromagnetic influence by the preload springs, which in turn is beneficial for a high level of detection accuracy of the sensor arrangement.

In particular with regard to as uniform as possible a distribution of force in the application of the preload, it is preferable if the preload springs are angularly spaced apart from one another uniformly about the central axis, and/or are radially spaced apart from the central axis to the same extent. This also permits the use of identical preload springs, which is advantageous in particular from the aspect of low costs.

Provision may basically be made whereby the preload springs are arranged in the pressure chamber between the base of the cylinder housing and a planar face surface, facing towards the base, of the ring-shaped piston. By contrast, however, in particular with regard to a small axial structural space requirement, what is preferable is an embodiment in which the ring-shaped piston has, on its side facing toward the pressure chamber, apertures in which the preload springs are received by way of one end, and/or guide projections are arranged on the base of the cylinder housing for the purposes of receiving the preload springs, which guide projections project into the pressure chamber. Here, the preload springs are also advantageously guided or supported for prevention of lateral buckling.

In particular with regard to simple installation and low costs of the preload spring arrangement, high stability of the individual springs and good symmetry in the application of force, it is advantageous if three preload springs are provided. It is however basically also possible for the preload spring arrangement to have two or more than three, for example four or five, preload springs.

As preload springs, use may for example be made of wound flat spiral springs, such as evolute springs or double evolute springs. By contrast, in particular with regard to low costs and good availability, it is however preferable if the preload springs are helical compression springs.

In a preferred embodiment, the cylinder housing may furthermore have an extension which extends into the pressure chamber between the preload springs as viewed in the circumferential direction about the central axis and which is configured for receiving the position detector positionally fixedly with respect to the cylinder housing.

In this way, the position detector can be brought as close as possible to the ring-shaped piston and to a position encoder connected thereto, which in turn promotes a high level of detection accuracy. Also, in this embodiment of the central release mechanism, the position detector is protected in a particularly advantageous manner by the extension of the cylinder housing.

It is furthermore preferable if the extension of the cylinder housing extends into the pressure chamber substantially parallel to the central axis, and plunges into an aperture of the ring-shaped piston, which aperture is arranged in the ring-shaped piston adjacent to the position encoder. Although it would basically also be possible for the extension of the cylinder housing to end before the ring-shaped piston as viewed in an axial direction, the central release mechanism would however be of axially longer construction in the case of such an embodiment.

It is basically possible for the position encoder to be situated at the outside or—depending on the detection principle of the sensor arrangement—at a level with the position detector relative to the position detector in the radial direction as viewed with respect to the central axis. However, with regard to the highest possible detection accuracy, an embodiment is preferred in which the position encoder is situated in the ring-shaped piston at the inside in relation to the position detector in a radial direction as viewed with respect to the central axis. Out of the discussed alternatives, this advantageously ensures the shortest spacing to the central axis and thus the smallest axial deflection in the event of tilting of the ring-shaped piston with respect to the cylinder housing.

A further advantage of the above-described plunging principle (extension of the cylinder housing in the associated aperture of the ring-shaped piston) consists in that the extension can also serve for securing the ring-shaped piston against rotation relative to the cylinder housing, such that the extension performs multiple functions simultaneously. In this context, it is particularly preferred if—instead of other or additional measures (for example guide groove in the ring-shaped piston, associated guide projection on a piston running surface of the cylinder housing, or vice versa)—the extension of the cylinder housing is adapted in particular in terms of strength to secure the ring-shaped piston against a rotation about the central axis with respect to the cylinder housing.

In a particularly durable embodiment, the extension of the cylinder housing may be formed by a cup-shaped sleeve, which may be welded in a sealed manner to the cylinder housing, and/or may be composed of a substantially non-magnetizable high-grade steel. The latter advantageously permits the use of an inexpensive Hall sensor arrangement as position detector on the cylinder housing, with a magnet as position encoder in or on the ring-shaped piston. The use of other position or stroke detection principles, such as for example a so-called PLCD sensor arrangement ("PLCD"=" Permanentmagnetic Linear Contactless Displacement"), is however also conceivable.

With regard to particularly low friction and the least possible wear, provision is preferably made whereby the extension of the cylinder housing is slidingly guided in the aperture of the ring-shaped piston. This may be realized by means of measures on the extension and/or in the aperture, such as for example a friction-reducing coating or the like, wherein measures in/on the aperture are preferred with regard to the greatest possible mechanical strength.

In a preferred embodiment, it is furthermore possible for the base of the cylinder housing to have an encircling shoulder which extends substantially parallel to the central axis in the direction of the ring-shaped piston. By means of said shoulder, the central release mechanism can, with a small axial and radial structural space requirement, be easily centred on an associated step or fastening flange of a transmission housing. Other means of centring the central release mechanism at the installation location are basically also conceivable, for example at the outside by means of the outer wall of the cylinder housing or on the inside by means of the inner wall of the cylinder housing, which would however increase the radial structural space requirement in relation to the above-mentioned shoulder solution.

In principle, the attachment of the shoulder to an inner wall of the cylinder housing may be realized by means of a housing portion running at right angles to the central axis. It is however preferable if the base of the cylinder housing has a connecting portion, which adjoins the shoulder radially at the inside, to the inner wall of the cylinder housing, which connecting portion is set back radially inwards from radially outside with respect to the ring-shaped piston. This gives rise, in this region of the cylinder housing, and as viewed in cross section, to a substantially S-shaped profile of the cylinder housing, which makes it possible, in the case of the above-mentioned shoulder solution, for the inner circumferential surface, assigned to the inner wall, of the ring-shaped piston to be correspondingly lengthened without varying the length dimensions of the cylinder housing. This advantageously permits a relatively long guide surface on the ring-shaped piston. The longer this guide surface is in the presence of the same radial play between ring-shaped piston and cylinder housing, the lower is the tendency for the ring-shaped piston to tilt relative to the cylinder housing. This measure thus in turn promotes a high level of detection accuracy of the sensor arrangement.

In this embodiment of the cylinder housing, it is finally also preferred if the ring-shaped piston is equipped, on its side facing towards the pressure chamber, with a ring-shaped aperture which runs around the central axis and which, as viewed in cross section, has a contour complementary with respect to the connecting portion. As long as a stroke movement of the ring-shaped piston in the cylinder housing is not impeded, the above-mentioned aperture in the ring-shaped piston may duly basically have any desired contour, but a substantially complementary form of connecting portion on the cylinder housing and aperture in the ring-shaped piston is advantageous in particular with regard to the smallest possible pneumatic dead volume of the pressure chamber.

BRIEF DESCRIPTION OF THE DRAWINGS

Below, the invention will be discussed in more detail on the basis of a preferred exemplary embodiment with reference to the appended, partially schematic drawings, in which.

In the drawings, elastic or elastomer components, in particular the static and dynamic seals or O-rings, are shown in the non-deformed state in order to simplify the illustration; in reality, these deformable components bear against the adjacent surfaces of adjoining components.

DETAILED DESCRIPTION OF THE EXEMPLARY EMBODIMENT

In FIGS. 1 to 9, the reference designation 10 generally denotes a central release mechanism for a pneumatic clutch actuating means. The central release mechanism 10 has a cylinder housing 12 which, about a central axis M, delimits a ring-shaped pressure chamber 14. In the pressure chamber 14, a ring-shaped piston 16 is guided so as to be displaceable along the central axis M, which ring-shaped piston can be pneumatically pressurized by the pressure chamber 14 and is operatively connectable, in a manner yet to be described in more detail, to a clutch.

The cylinder housing 12 has an inner wall 18 and an outer wall 20, which are connected to one another via a base 22. The inner wall 18 has an inner piston running surface 24 for the ring-shaped piston 16, which inner piston running surface defines an inner diameter d of the pressure chamber 14, whereas the outer wall 20 has an outer piston running surface 26 for the ring-shaped piston 16, which outer piston running surface defines an outer diameter D of the pressure chamber 14, wherein the ring-shaped piston 16 together with the inner wall 18, the outer wall 20 and the base 22 delimits the pressure chamber 14 in a variable manner. For the pneumatic pressurization or evacuation of the pressure chamber 14, the base 22 of the cylinder housing 12 is equipped, as per FIGS. 3 and 6, with a pressure port 28.

Furthermore, in the pressure chamber 14, between the ring-shaped piston 16 and the base 22 of the cylinder housing 12, there is provided a preload spring arrangement 30 which braces the ring-shaped piston 16 and the cylinder housing 12 apart from one another. The preload spring arrangement 30 accordingly preloads the ring-shaped piston 16 with a force in a direction away from the base 22 of the cylinder housing 12. A movement or displacement of the ring-shaped piston 16, which is secured against rotation about the central axis M with respect to the cylinder housing 12, relative to the cylinder housing 12 is furthermore detectable by means of a sensor arrangement 32, which has a position detector 34 positionally fixed with respect to the cylinder housing 12 and a position encoder 36 which is connected to the ring-shaped piston 16 with rotational angle orientation about the central axis M with respect to the position detector 34.

Figure 4:
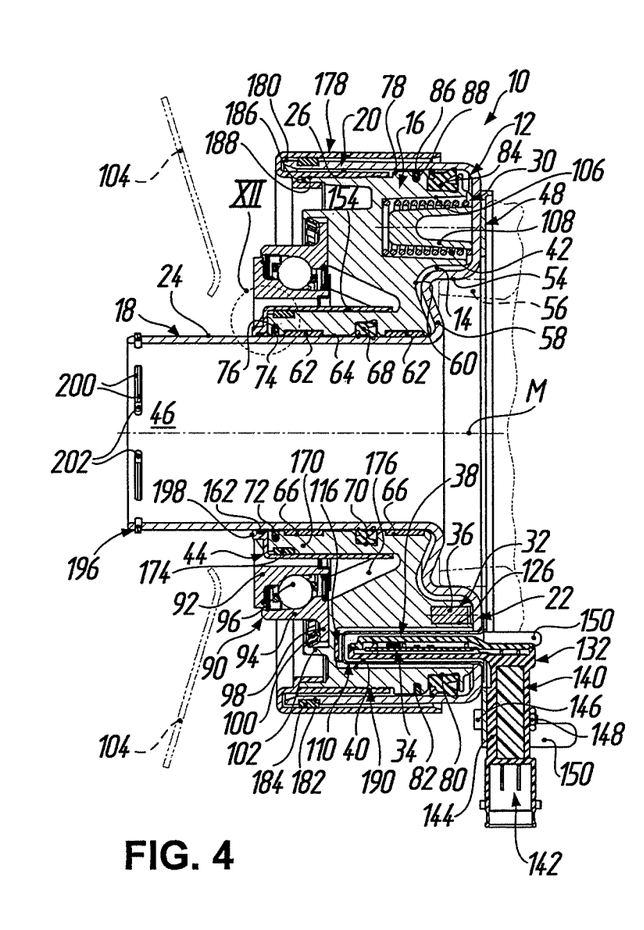
FIG. 4 shows a sectional view, on an enlarged scale in relation to FIG. 1, of the central release mechanism as per FIG. 1 in accordance with the section profile line IV-IV in FIG. 2, which runs through a sensor arrangement, provided at the radial margins of the pressure chamber, of the central release mechanism, with the central release mechanism in the delivery state, wherein, on the left-hand side in FIG. 4, spring tongues of a diaphragm spring on a clutch that is to be actuated by means of the central release mechanism, and on the right-hand side in FIG. 4, a fastening flange on a transmission housing, are indicated in cut-away form by means of dash-dotted lines in order to illustrate an installation situation for the central release mechanism.
Figure 12:
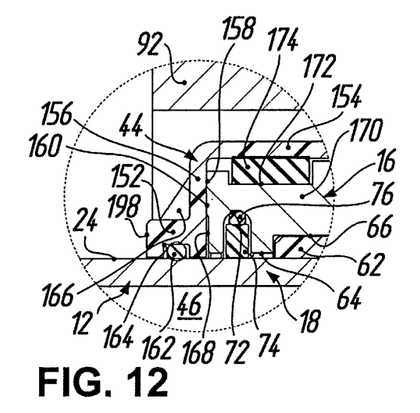
FIG. 12 shows an illustration, on an enlarged scale in relation to FIG. 4, of the detail XII in FIG. 4, which shows how the protective cap is held in the frictionally locking fashion on the cylinder housing.

As will be described in detail further below, in relation to the prior art discussed in the introduction, the central release mechanism 10 according to the illustrated exemplary embodiment has various special features in particular with regard to the following four points (i to iv): firstly (i), the position detector 34 and the position encoder 36 are arranged within the outer diameter D of the pressure chamber 14 in a radial direction as viewed with respect to the central axis M (see in particular FIG. 7). Furthermore (ii), the cylinder housing 12 has an extension 38 which extends into the pressure chamber 14 substantially parallel to the central axis M, which extension plunges into an aperture 40 of the ring-shaped piston 16, which aperture is arranged in the ring-shaped piston 16 adjacent to the position encoder 36 (see again FIG. 7. Here, the extension 38 is designed for receiving the position detector 34 positionally fixedly with respect to the cylinder housing 12, such that at least a part of the sensor arrangement 32 is received in the region of the pressure chamber 14, and said extension is at the same time adapted to secure the ring-shaped piston 16 against rotation about the central axis M with respect to the cylinder housing 12. Furthermore (iii), the preload spring arrangement 30 has a multiplicity of preload springs 42, which are distributed, so as to be angularly spaced apart from one another, about the central axis M, as can be seen in particular from FIG. 9. Here, between the preload springs 42 as viewed in a circumferential direction about the central axis M, at least a part of the sensor arrangement 32 is arranged in the region of the pressure chamber 14. Finally (iv), at least one of the piston running surfaces 24, 26—in the illustrated exemplary embodiment the radially inner piston running surface 24—is protected with respect to the surroundings by means of a protective cap 44, which also serves for temporarily fixing the ring-shaped piston 16 in a predetermined stroke position relative to the cylinder housing 12 counter to the force of the preload spring arrangement 30, in particular for the purposes of transport and installation, as is shown in FIGS. 4 and 12.

As per FIGS. 4 to 8, the inner wall 18, the outer wall 20 and the base 22 of the cylinder housing 12 are, in the exemplary embodiment illustrated, deep-drawn as a single piece from a metallic material, possibly with suitable aftertreatment, such as for example hardening and/or ball burnishing. Here, as viewed along the central axis M, the inner wall 18 projects to the left in FIGS. 4 to 8 beyond the outer wall 20 and, in a radially inward direction, delimits a central passage 46 for a transmission shaft (not shown).

The cylinder housing 12 furthermore has a substantially ring-shaped metallic fastening flange 48, which is suitably fastened, for example welded by resistance spot welding, to the base 22. As per FIGS. 2 and 3, the fastening flange 48 has three fastening lugs 50, which are angularly spaced apart from one another substantially uniformly about the central axis M and which project radially outward beyond the outer circumference of the outer wall 20, where they are each equipped with a fastening bore 52. By means of the fastening lugs 50, the central release mechanism 10 can be fastened by means of screws to a transmission wall (not shown).

It can also be seen in particular from FIGS. 4 to 8 that the base 22 of the cylinder housing 12 has an encircling shoulder 54 which extends substantially parallel to the central axis M in the direction of the ring-shaped piston 16. By means of said shoulder 54, the central release mechanism 10 can be centred on a fastening flange 56 of the transmission housing, which is indicated in cut-away form by means of dash-dotted lines in FIGS. 4 to 7. The base 22 of the cylinder housing 12 furthermore has a connecting portion 58, which adjoins the shoulder 54 radially at the inside, to the inner wall 18, which connecting portion is set back radially inwards from radially outside with respect to the ring-shaped piston 16, that is to say runs, in FIGS. 4 to 8, radially inwards from radially outside, obliquely from left to right. This results, as viewed in the cross section as per FIGS. 4 to 8, in a substantially S-shaped contour of the transition between the base 22 and the inner wall 18 of the cylinder housing 12.

As is shown most clearly in FIG. 4, the ring-shaped piston 16 is equipped, on its side facing toward the pressure chamber 14, with a ring-shaped aperture 60 which runs around the central axis M and which, as viewed in cross section, has a contour complementary with respect to the connecting portion 58 of the cylinder housing 12. In this way, with a small axial structural space requirement, the longest possible guide length between ring-shaped piston 16 and inner wall 18 is achieved, which is beneficial for a small degree of tilting of the ring-shaped piston 16 on the inner wall 18. At the same time, by means of the complementary contours on cylinder housing 12 (connecting portion 58) and ring-shaped piston 16 (aperture 60), the pneumatic dead volume of the pressure chamber 14 is minimized.

As per FIGS. 4 to 8, the ring-shaped piston 16, which is composed for example of an aluminium alloy (or plastic, not illustrated) is guided on the inner piston running surface 24 of the cylinder housing 12 via two slide strips or rings 62 composed of for example polytetrafluoroethylene (PTFE), such as Teflon®, which are arranged on an inner circumferential surface 64 of the ring-shaped piston 16. More specifically, the ring-shaped piston 16 is equipped, on its inner circumferential surface 64, with two axially mutually spaced-apart radial grooves 66 for receiving the slide rings 62. Between the slide rings 62, a sealing element 68 is provided on the ring-shaped piston 16, which sealing element seals off the pressure chamber 14 with respect to the surroundings. The sealing element 68 is also received in an associated radial groove 70, which is formed between the radial grooves 66 for the slide rings 62 on the inner circumferential surface 64 of the ring-shaped piston 16. Thus, the slide rings 62 are, as viewed along the central axis M, spaced apart from one another to the greatest possible extent, which is likewise beneficial for a small degree of tilting of the ring-shaped piston 16 on the inner wall 18 of the cylinder housing 12.

In the vicinity of its end averted from the pressure chamber 14, the ring-shaped piston 16 is equipped, on the inner circumferential surface 64, with a further radial groove 72, in which a stripper ring 74 is received. The slotted stripper ring 74, which is composed of a suitable plastic, is preloaded against the inner piston running surface 24 on the inner wall 18 of the cylinder housing 12 by means of an O-ring 76 which surrounds said stripper ring in the radial groove 72, and said stripper ring serves as a further safeguard against fouling of the inner piston running surface 24, which interacts with the slide rings 62.

On an outer circumferential surface 78, the ring-shaped piston 16 is likewise equipped with two radial grooves 80, 82. In the radial groove 80 that is closer to the pressure chamber 14, there is received a further sealing element 84 which interacts with the outer piston running surface 26 on the outer wall 20 of the cylinder housing 12, which further sealing element seals off the pressure chamber 14 with respect to the surroundings. By contrast, the other radial groove 82, which is further remote from the pressure chamber 14, serves for receiving a further slotted stripper ring 86, which interacts with the outer piston running surface 26 in order to protect the latter against fouling. Radially within the stripper ring 86, which is composed of a suitable plastic, it is also the case that an O-ring 88 is received in the radial groove 82, which O-ring, by means of its elastic cross section, preloads the stripper ring 86 away from the groove base of the radial groove 82 in a radially outward direction against the outer piston running surface 26 on the outer wall 20 of the cylinder housing 12.

In the exemplary embodiment illustrated, the two sealing elements 68, 84 are elastomer groove rings, which bear in each case with two dynamic sealing lips against the associated piston running surface 24 or 26 of the cylinder housing 12. It is preferable for each of the sealing elements 68, 84 to be equipped with a lifetime lubrication in the form of grease pockets (not shown) between the dynamic sealing lips, which grease pockets are distributed over the circumference of the respective sealing element 68, 84.

On the side averted from the pressure chamber 14, a release bearing 90 is attached to the ring-shaped piston 16, which release bearing has, in a manner known per se, an inner ring 92, an outer ring 94 and a multiplicity of rolling bodies 96 between inner ring 92 and outer ring 94. The release bearing 90 is fastened by means of its outer ring 94 to the ring-shaped piston 16. For this purpose, the outer ring 94 has a ring-shaped collar 98, which is held by means of a ring-shaped angled spring element 100 on an undercut ring-shaped web 102 of the ring-shaped piston 16, which ring-shaped web extends away from the ring-shaped piston 16 on that side of the ring-shaped piston 16 which is averted from the pressure chamber 14. In the installed state of the central release mechanism 10, the inner ring 92 of the release bearing 90 bears, as per FIGS. 5 to 7, at a face side against spring tongues 104 of a diaphragm spring of a clutch that is to be actuated by means of the central release mechanism 10, of which clutch only the spring tongues 104 are indicated, in cut-away form by means of dash-dotted lines, in FIGS. 4 to 7.

Figure 7:
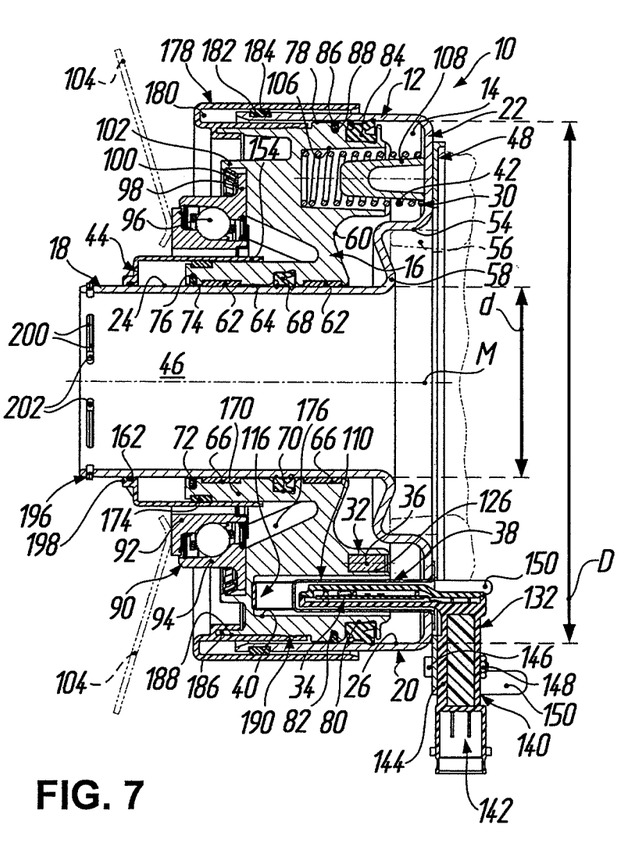
FIG. 7 shows a sectional view, on an enlarged scale in relation to FIG. 1, of the central release mechanism as per FIG. 1, with section profile and installation situation corresponding to FIG. 4, wherein the ring-shaped piston is, with respect to the cylinder housing, situated in the relative position of FIG. 1, which corresponds to the pneumatically load-free installation state of the central release mechanism after the initial actuation thereof, and in which the forces, acting on the ring-shaped piston, of the diaphragm spring, on the one hand, and of a preload spring arrangement received in the pressure chamber, on the other hand, maintain the balance.
Figure 8:
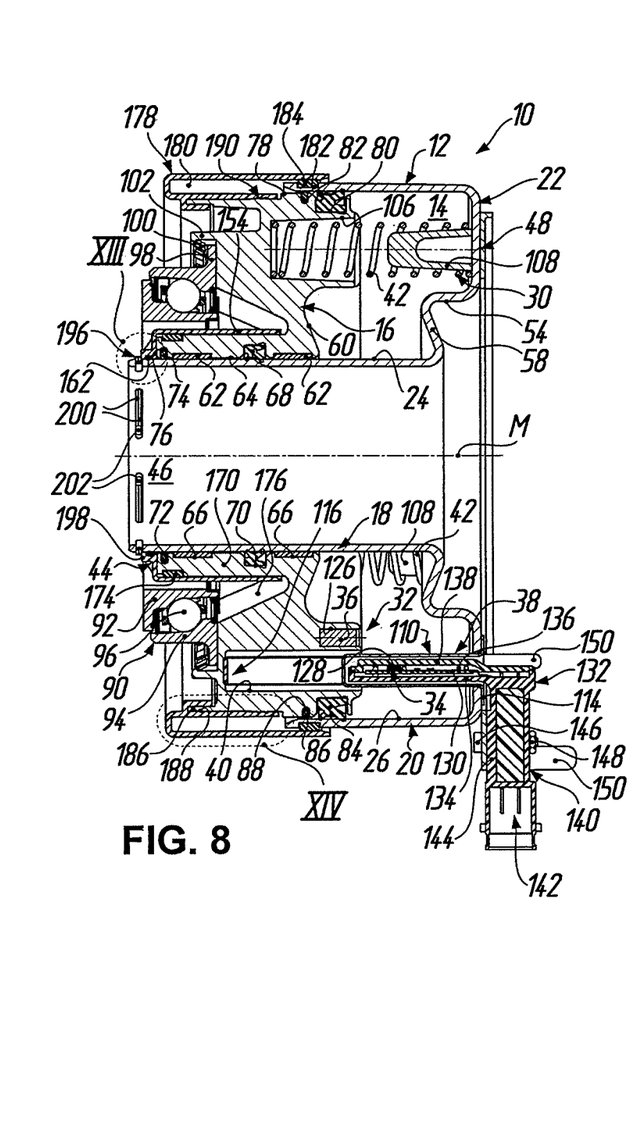
FIG. 8 shows a sectional view, on an enlarged scale in relation to FIG. 1, of the central release mechanism as per FIG. 1, with section profile corresponding to FIG. 4, but in an uninstalled state, in which no diaphragm spring acts on the ring-shaped piston, wherein the ring-shaped piston preloaded by means of the preload spring arrangement is, after pneumatic loading, held by means of the protective cap against an end stop provided on the cylinder housing.
Figure 9:
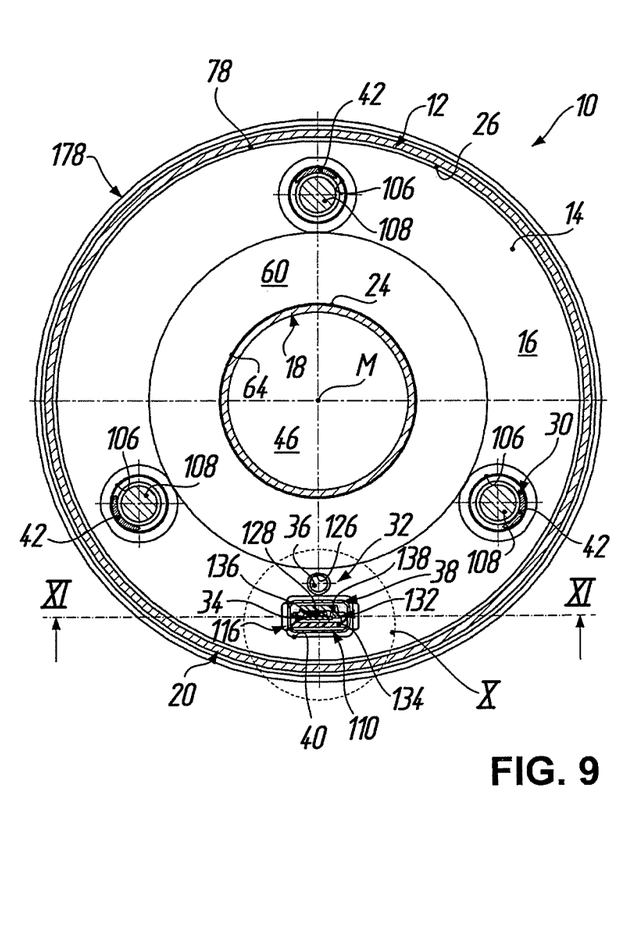
FIG. 9 shows a sectional view of the central release mechanism as per FIG. 1 corresponding to the section profile line IX-IX in FIG. 5 and on the scale of FIG. 5, for the purposes of illustrating further details of the preload spring arrangement and of the sensor arrangement in the pressure chamber of the central release mechanism.

FIGS. 8 and 9 in particular show further details of the preload spring arrangement 30 received in the pressure chamber 14 of the central release mechanism 10, which spring arrangement serves, in the installed state of the central release mechanism 10, to push the release bearing 90, which is borne by the ring-shaped piston 16, by way of its inner ring 92 with a predefined force against the clutch, that is to say the spring tongues 104 thereof, at all times (cf. FIGS. 5 to 7), such that the release bearing 90 runs concomitantly in all operating states, which minimizes the wear thereof. In the exemplary embodiment illustrated, the preload spring arrangement 30 comprises three preload springs 42, which are angularly spaced apart from one another uniformly about the central axis M, as per FIG. 9. FIG. 9 also shows that the preload springs 42 are radially spaced apart from the central axis M to the same extent, that is to say lie on a common pitch circle about the central axis M.

As per FIGS. 4 to 8, in the exemplary embodiment illustrated, the preload springs 42 of the preload spring arrangement 30 are helical compression springs. On its side facing toward the pressure chamber 14, the ring-shaped piston 16 has frustoconical apertures 106, in which the preload springs 42 are received by way of one end. At their opposite, other ends, the preload springs 42 are received on guide projections 108, which are arranged on the base 22 of the cylinder housing 12 radially outside the shoulder 54 and project into the pressure chamber 14. The guide projections 108, which are slightly conical on the outer circumference, are formed by cup-like metallic sleeves, which are fastened by spot welding to the base 22 of the cylinder housing 12.

As per FIG. 4, the guide projections 108 of the cylinder housing 12, on the one hand, and the apertures 106 in the ring-shaped piston 16, on the other hand, are dimensioned in terms of length or depth and diameter such that, in the position of the ring-shaped piston 16 in which it has been displaced into the pressure chamber 14 to a maximum extent, the guide projections 108 of the cylinder housing 12 duly plunge into the apertures 106 of the ring-shaped piston 16 but do not make contact, by way of their respective face side, with the base of the respectively associated aperture 106. Furthermore, even in this position of the ring-shaped piston 16, a ring-shaped gap remains in each case between the guide projections 108 and the apertures 106 for the purposes of freely receiving the respective compressed preload spring 42, as can be clearly seen in FIG. 4.

As shown in the sectional view as per FIG. 9, the above-mentioned extension 38 extends into the pressure chamber 14 between the preload springs 42 as viewed in a circumferential direction about the central axis M, specifically such that said extension is angularly spaced apart from the adjacent preload springs 42 equally by approximately 60° about the central axis M. Also, the extension 38 lies approximately on the pitch circle of the preload springs 42 about the central axis M, that is to say has substantially the same radial spacing to the central axis M as the preload springs 42.

Figure 10:
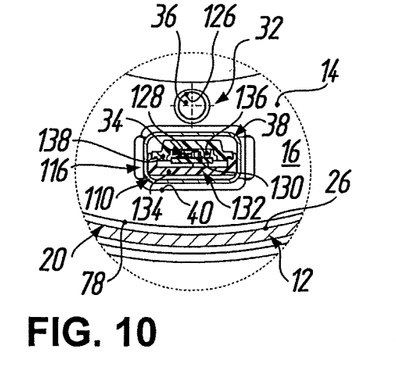
FIG. 10 shows an illustration, on an enlarged scale, of the detail X in FIG. 9 in the region of the sensor arrangement.

As per FIGS. 5, 9, 10 and 11 in particular, the extension 38 of the cylinder housing 12 is formed by a cup-shaped sleeve 110, which is composed of a substantially non-magnetizable high-grade steel and which is sealingly welded to the cylinder housing 12. For this purpose, the sleeve 110, which is substantially rectangular as viewed in the cross section as per FIG. 10, is led through a complementarily shaped opening 112 in the base 22 of the cylinder housing 12 (see FIG. 11) and bears, at that side of the base 22 which is averted from the pressure chamber 14, against the base 22 by way of a collar 114, which is likewise of substantially rectangular shape as viewed in a plan view as per FIG. 3. In the region of this collar 114, the sleeve 110 is laser-welded in pressure-tight fashion to the base 22, such that the extension 38 is a fixed constituent part of the cylinder housing 12.

As per FIG. 10, the aperture 40 formed in the ring-shaped piston 16 for the purposes of receiving the extension 38 also has a substantially rectangular cross section. The extension 38 is slidingly guided with low friction in said aperture 40. More specifically, the extension 38 of the cylinder housing 12 is slidingly guided in the aperture 40 of the ring-shaped piston 16 by means of an insert part 116 composed of a plain bearing material (for example polytetrafluoroethylene (PTFE), such as Teflon®), which in FIG. 11, at the reference designation 118, is held in the aperture 40 of the ring-shaped piston 16 by means of a snap-action connection. For this purpose, the insert part 116 has, on the outer circumference, snap-action hooks 120 which, in the installed state of the insert part 116, engage into associated grooves 122 in the aperture 40. Furthermore, on the end side, the insert part 116 has spring tongues 124, which in the installed state of the insert part 116 are supported on the base of the aperture 40 and thus resiliently preload the snap-action hooks 120 into the grooves 122, such that the insert part 116 is held without play in the aperture 40.

Figure 11:
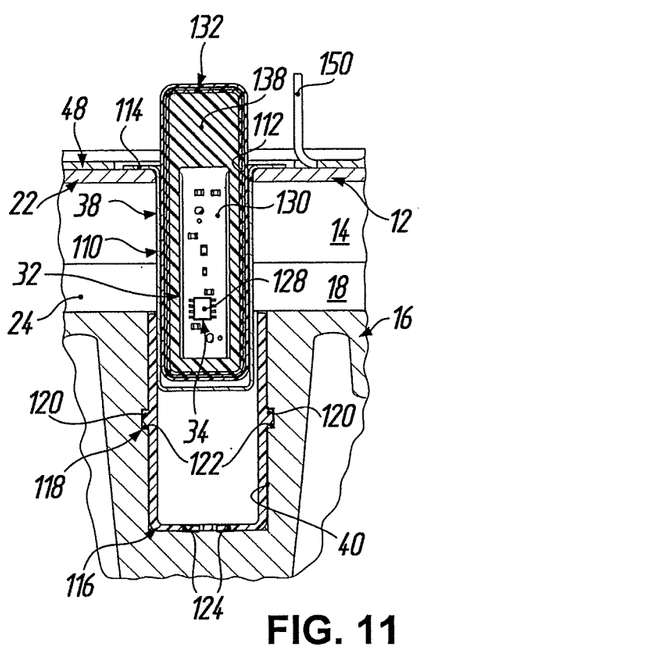
FIG. 11 shows a cut-away sectional view, on an enlarged scale in relation to FIG. 9, of the central release mechanism as per FIG. 1 in accordance with the section profile line XI-XI in FIG. 9, for the purposes of illustrating further details in the region of the sensor arrangement.

It can likewise be seen in FIG. 11 that the insert part 116, which lines the aperture 40 in the ring-shaped piston 16, can be supported laterally, that is to say to the right in FIG. 11, on the sleeve 110 which forms the extension 38 of the cylinder housing 12, specifically even in the state shown in FIG. 8, in which the ring-shaped piston 16 has been deployed to a maximum extent out of the cylinder housing 12, whereby the ring-shaped piston 16 is secured against rotation about the central axis M relative to the cylinder housing 12.

With regard to further details of the sensor arrangement 32, reference is made in particular to FIGS. 8 to 11. As is shown firstly by FIGS. 8 and 9, the ring-shaped piston 16 is equipped, on its side facing toward the pressure chamber 14, with an aperture 126 for receiving the position encoder 36. The aperture 126 is, in FIGS. 8 and 9, formed above the aperture 40 for the purposes of slidingly receiving the extension 38, and, in the immediate vicinity of this, as a blind bore with a circular cross section. The cylindrical position encoder 36 is adhesively bonded in the aperture 126, which position encoder is a permanent magnet in the exemplary embodiment illustrated. It can be seen that, in this way, the position encoder 36 on the ring-shaped piston 16 is situated at the inside in relation to the position detector 34 in the extension 38 of the cylinder housing 12 in a radial direction as viewed with respect to the central axis M. Thus, a certain degree of tilting of the ring-shaped piston 16 on the inner piston running surface 24 of the cylinder housing 12 leads only to a small axial displacement of the position encoder 36 owing to the relatively short lever arm between the position encoder 36 and the central axis M.

In the present exemplary embodiment as per FIGS. 10 and 11, the position detector 34 comprises a Hall element 128, which interacts in a manner known per se with the above-mentioned permanent magnet as position encoder 36 and which is situated on a circuit board 130, which is received in a sensor housing 132 composed of a plastics material. As shown in particular by FIGS. 8, 10 and 11, the sensor housing 132 has a main body 134 with a cavity 136 for receiving the circuit board 130, which cavity is closed off by means of a cover 138 which is laser-welded to the main body 134.

As shown in particular in FIGS. 8, 10 and 11, the main body 134 and the cover 138 of the sensor housing 132 are received tightly in the sleeve 110 of the projection 38, such that the circuit board 130 with the Hall element 128 is situated entirely in the extension 38, wherein the main body 134 and the cover 138 project, on the right-hand side in FIG. 8 or upward in FIG. 11, out of the extension 38 beyond the collar 114 of the sleeve 110. There, the main body 134 of the sensor housing 132 is adjoined, downwardly in FIG. 8, by a connector portion 140 of the sensor housing 132, which connector portion forms a right angle with the main body 134. In the connector portion 140, there is integrated, as per FIG. 8 in particular, an electrical plug connector 142, by means of which the circuit board 130, which bears the Hall element 128, of the sensor arrangement 32 is electrically contacted in a manner which is not shown in more detail in the figures but which is known per se (press-fit connection or soldered connection).

The connector portion 140 furthermore has a flange region 144, by way of which the connector portion 140 bears areally against the fastening flange 48 of the cylinder housing 12, as shown for example in FIG. 8. In the exemplary employment illustrated, the sensor housing 132 is screwed, in the flange region 144, to the fastening flange 48 of the cylinder housing 12, such that the position detector 34 of the sensor arrangement 32 is fixedly connected to the cylinder housing 12. As shown in particular by FIGS. 1 to 3, this screw connection comprises two cylinder screws 146, which engage through associated fastening bores (not illustrated) in the fastening flange 48 of the cylinder housing 12 and in the flange region 144 of the sensor housing 132, and associated nuts 148.

It is thus clear that the connector portion 140 of the sensor housing 132 projects, on the side averted from the pressure chamber 14, beyond the base 22 of the cylinder housing 12. In order to protect the sensor housing 132 and in particular its connector portion 140 against mechanical damage, the fastening flange 48 of the cylinder housing 12 is equipped with protective lugs 150, which are preferably bent at right angles with respect to the flange plane and which protrude beyond the connector portion 140 of the sensor housing 132 in a direction away from the base 22 of the cylinder housing 12. Thus, the central release mechanism 10 which has not yet been installed, or which has been uninstalled, can be set down by way of the base side of the cylinder housing 12 on a surface, without the sensor arrangement 32 being subjected to mechanical load.

Further details relating to the radially inner protective cap 44, which in the exemplary embodiment illustrated is formed, preferably by injection moulding, from a suitable plastic, can be seen in particular from FIGS. 4 and 12. Accordingly, the protective cap 44 has a radially inner collar portion 152, a radially outer shell portion 154 and a ring-shaped base portion 156 extending between the collar portion 152 and the shell portion 154, which base portion forms a stop surface 158 for a face surface 160 of the ring-shaped piston 16. In order that the ring-shaped piston 16 can be temporarily fixed in a predetermined stroke position relative to the cylinder housing 12 counter to the force of the preload spring arrangement 30 in particular for the purposes of transport and installation, the protective cap 44 in the exemplary embodiment illustrated is held in non-positively locking or frictionally locking fashion on the inner piston running surface 24. More specifically, the protective cap 44 is, at its end averted from the base 22 of the cylinder housing 12, held on the inner piston running surface 24 by means of an elastomer O-ring 162. Here, the collar portion 152 of the protective cap 44 is equipped with a radial groove 164 for receiving and axially securing the O-ring 162 on the protective cap 44.

Figure 6:
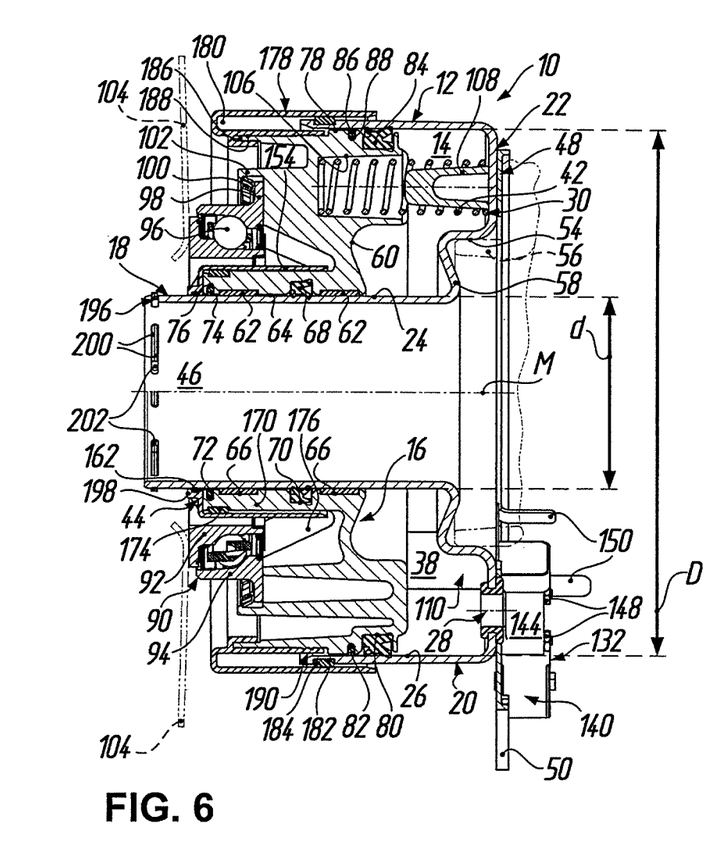
FIG. 6 shows a sectional view, on an enlarged scale in relation to FIG. 1, of the central release mechanism as per FIG. 1 in accordance with the angled section profile line VT-VI in FIG. 3, which leads through a pressure port of the central release mechanism, again with the central release mechanism indicated in an installed state in the initial actuation state corresponding to FIG. 5.

In the non-deformed state, the O-ring 162 has an inner diameter smaller than the inner diameter d of the pressure chamber 14 formed by the inner piston running surface 24 (see FIGS. 6 and 7). By contrast, in a state in which it has been stretched onto the inner piston running surface 24 of the cylinder housing 12 and in which it is not delimited radially to the outside, an outer diameter of the O-ring 162 is larger than an inner diameter of the collar portion 152 of the protective cap 44 at the base of the radial groove 164. It is evident to a person skilled in the art that, owing to this dimensioning, the O-ring 162, in its state received in the radial groove 164 of the collar portion 152 of the protective cap 44, is elastically compressed between the inner piston running surface 24 and the base of the radial groove 164. Thus, the O-ring 162 subjects a circumferential line of the inner piston running surface 24 to normal forces which generate friction forces there which, in accordance with the coefficient of static friction of the material pairing in the contact region of piston running surface 24 and O-ring 162, exhibit a relationship with the imparted normal forces and are always greater than the spring force of the preload spring arrangement 30 in the pressure chamber 14.

Thus, if the ring-shaped piston 16 preloaded only by means of the preload spring arrangement 30 presses by way of its face surface 160 against the stop surface 158 on the base portion 156 of the protective cap 44, then the O-ring 162 in the radial groove 164 of the protective cap 44 acts counter to the spring force of the preload spring arrangement 30, specifically even in the maximally compressed state of the preload spring arrangement 30 corresponding to FIG. 4, wherein the collar portion 152 of the protective cap 44 possibly comes into contact, by way of a flank of the radial groove 164, with the O-ring 162. Only as a result of additional pneumatic pressurization of the pressure chamber 14 can the ring-shaped piston 16 be subjected to a resultant force along the central axis M which overcomes the static friction between piston running surface 24 and O-ring 162, such that sliding friction prevails there and the protective cap 44 is, where possible, displaced on the inner piston running surface 24 away from the pressure chamber 14.

Figures 1, 2, 3:
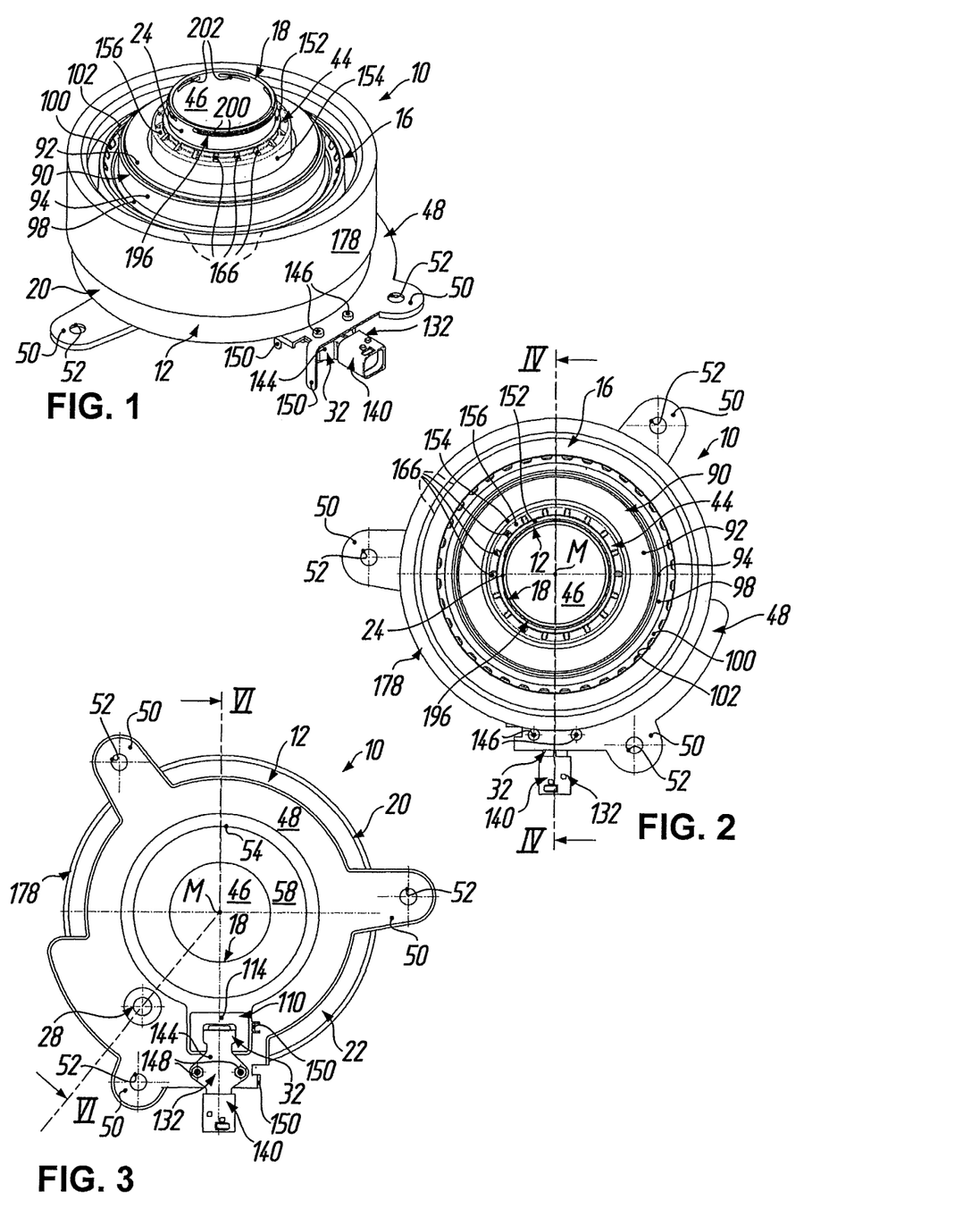
FIG. 1 shows a perspective view of a central release mechanism according to the invention from obliquely above/front left, having a cylinder housing and having a ring-shaped piston which is guided displaceably therein so as to form a pressure chamber, wherein the ring-shaped piston and the cylinder housing are illustrated in a relative position which corresponds to a pneumatically load-free installation state of the central release mechanism after the initial actuation thereof.
FIG. 2 shows a plan view of the central release mechanism as per FIG. 1 from above in FIG. 1, wherein the ring-shaped piston is, by means of a protective cap situated in a basic position, held in a stroke position in which it has been displaced into the cylinder housing to a maximum extent, which corresponds to a delivery state of the central release mechanism.
FIG. 3 shows a view from below of the central release mechanism as per FIG. 1 from below in FIG. 1, wherein the ring-shaped piston is, with respect to the cylinder housing, situated in a relative position which is assumed in the event of an initial actuation of the central release mechanism, and by means of which the protective cap is transferred from its basic position into an operating position.

As can be seen in particular from FIGS. 1 and 2, on that side of the protective cap 44 which is averted from the pressure chamber 14, a multiplicity of ribs 166 is provided between the collar portion 152 and the base portion 156, which ribs are distributed uniformly over the circumference and stiffen the protective cap 44 at this location. It can also be seen in FIG. 12 that the face surface 160 on the ring-shaped piston 16 is formed with a radial spacing to the inner piston running surface 24 in an axial direction, that is to say is of elevated form as viewed along the central axis M, such that the ring-shaped piston 16 makes contact with the protective cap 44 at a point with a radial spacing to the inner piston running surface 24. In other words, the protective cap 44 has a ring-shaped aperture radially within said contact region at the reference designation 168. This embodiment ensures in particular that the contact between ring-shaped piston 16 and protective cap 44 is realized in a radially outer, stiffened region of the protective cap 44, such that those regions of the ring-shaped piston 16 (at the radial groove 72) and of the protective cap (at the radial groove 164) which are close to the running surface are not unduly subjected to load, which could lead for example to material fracture there.

As per FIGS. 4 to 8, the protective cap 44, by way of its shell portion 154 on that side of the ring-shaped piston 16 which is averted from the pressure chamber 14, surrounds a ring-shaped piston extension 170, which in these figures extends to the left as far as below the inner ring 92 of the release bearing 90. Close to its free end, the piston extension 170 is equipped on the outer circumference with a radial groove 172 (see FIG. 12), in which a felt ring 174 is received. The shell portion 154 of the protective cap 44 bears at the inner circumference against the felt ring 174, which can slide on the shell portion 154. The felt ring 174 thus also forms, between protective cap 44 and piston extension 170, a further protector for the inner piston running surface 24 of the cylinder housing 12 with respect to the surroundings.

As is also shown in FIGS. 4 to 8, the ring-shaped piston 16 has, on its side averted from the pressure chamber 14, a ring-shaped aperture 176 which, in these figures, extends to the right proceeding from the release bearing 90 and which is delimited radially at the inside by the piston extension 170.

If the protective cap 44 is situated in a relative position with respect to the ring-shaped piston 16 in which the face surface 160 of the ring-shaped piston 16 bears against the stop surface 158 of the protective cap 44 (cf. FIG. 12), then the protective cap 44 is, by way of its shell portion 154, received under the inner ring 92 of the release bearing 90 in protected fashion in the ring-shaped aperture 176.

In the exemplary embodiment illustrated, the outer piston running surface 26 of the cylinder housing 12 is also protected by means of a further protective cap 178 which is attached without play to the ring-shaped piston 16, and which is likewise formed from a suitable plastic, preferably by injection moulding. The protective cap 178 has a ring-shaped chamber 180 which is closed to the left in FIGS. 4 to 8 and into which the cylinder housing 12 plunges by way of its outer wall 20. Close to its free end, the outer wall 20 of the cylinder housing 12 is equipped on the outer circumference with a radial groove 182 for receiving a further felt ring 184, on which the protective cap 178 can slide. Analogously to the felt ring 174 on the inner protective cap 44, the felt ring 184 on the outer protective cap 178 forms a further protector for the outer piston running surface 26 of the cylinder housing 12 with respect to the surroundings.

For the fastening of the further protective cap 178 to the ring-shaped piston 16, the ring-shaped piston 16 is firstly equipped, on its side averted from the pressure chamber 14, with a ring-shaped web 186, whereas the protective cap 178 has, radially within the ring-shaped chamber 180, a ring-shaped aperture 188 for receiving the ring-shaped web 186. By insertion of the ring-shaped web 186 into the ring-shaped aperture 188, the protective cap 178 is centred with respect to the ring-shaped piston 16 and is secured on the ring-shaped piston 16 in a radial direction.

Figure 14:
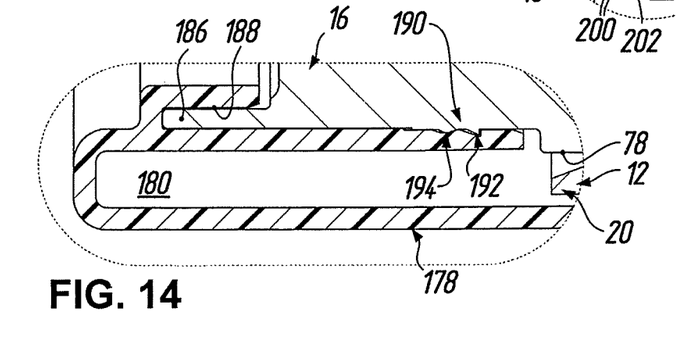
FIG. 14 shows an illustration, on an enlarged scale in relation to FIG. 8, of the detail XIV in FIG. 8, which illustrates how a further protective cap is fastened to the ring-shaped piston.

For axially securing the protective cap 178 on the ring-shaped piston 16, a snap-action connection 190 is provided as per FIGS. 8 and 14, specifically between the outer circumferential surface 78, which is offset there with a step, of the ring-shaped piston 16 and an inner circumferential surface of the protective cap 178. The snap-action connection 190 has, at the reference designation 192, complementary contours with hook cross section and undercut on the circumference of ring-shaped piston 16 and protective cap 178, which contours give rise to detent engagement of the protective cap 178 on the ring-shaped piston 16. Furthermore, the snap-action connection 190 comprises, at the reference designation 194, oblique surfaces on ring-shaped piston 16 and protective cap 178, which oblique surfaces are configured and positioned such that, in conjunction with the elastic characteristics of the material of the protective cap 178, they pull the protective cap 178 against the ring-shaped piston 16, whereby the ring-shaped web 186 of the ring-shaped piston 16 is held in contact with a certain preload against the base of the ring-shaped aperture 188 of the protective cap 178. It can be seen that the protective cap 178 is thus fastened without play to the ring-shaped piston 16 and moves together with the ring-shaped piston 16 with respect to the cylinder housing 12.

Figure 13:
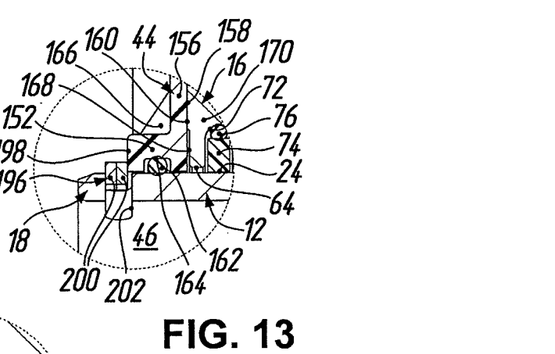
FIG. 13 shows an illustration, on an enlarged scale in relation to FIG. 8, of the detail XIII in FIG. 8, for the purposes of illustrating further details of the end stop on the cylinder housing.

Finally, as per FIGS. 8 and 13, an end stop 196 is provided on the cylinder housing 12, more specifically the inner wall 18 thereof, at one end of the inner piston running surface 24, with which end stop the protective cap 44 can be brought into contact in order to secure the ring-shaped piston 16 in a position in which it has been displaced out of the pressure chamber 14 to a maximum extent. Here, the end stop 196 interacts with a face surface 198 on the collar portion 152 of the protective cap 44.

In the exemplary embodiment illustrated, for strength purposes, the end stop 196 has two slotted serrated rings 200, which are arranged one behind the other as viewed along the central axis M and which engage with serrations, provided on the inner circumference, in associated apertures 202 on the circumference of the inner wall 18 of the cylinder housing 12 (see also FIGS. 1 and 2), such that the serrated rings 200, secured on the inner wall 18, project radially outward beyond the inner piston running surface 24, where the protective cap 44 can abut by way of its face surface 198 against the serrated ring 200 that is situated closer to the pressure chamber, as shown in FIG. 13.

With regard to the individual functional positions of the ring-shaped piston 16 in the cylinder housing 12 in interaction with the protective cap 44 for the inner piston running surface 24 and the end stop 196 on the inner wall 18 of the cylinder housing 12, reference is finally made once again to FIGS. 4 to 8. FIG. 4 shows the central release mechanism 10—albeit already installed between transmission (fastening flange 56) and clutch (spring tongues 104)—in the delivery state, in which the protective cap 44 which is assigned to and held on the inner piston running surface 24 of the cylinder housing 12 is situated relative to the inner piston running surface 24 in a basic position in which the protective cap 44 forms a stop for the ring-shaped piston 16 which is pre-loaded by means of the preload spring arrangement 30. Here, the ring-shaped piston 16 has been displaced to a maximum extent into the pressure chamber 14, which is not (yet) pneumatically pressurized, of the cylinder housing 12 and is held by static friction on the inner wall 18 of the cylinder housing 12 by means of the O-ring 162 of the protective cap 44. The protective cap 44 and the position detector 34 of the sensor arrangement 32 are protected to a maximum extent in the ring-shaped aperture 176 of the ring-shaped piston 16 and the extension 38 of the cylinder housing 12, with minimal dimensions of the central release mechanism 10.

Figure 5:
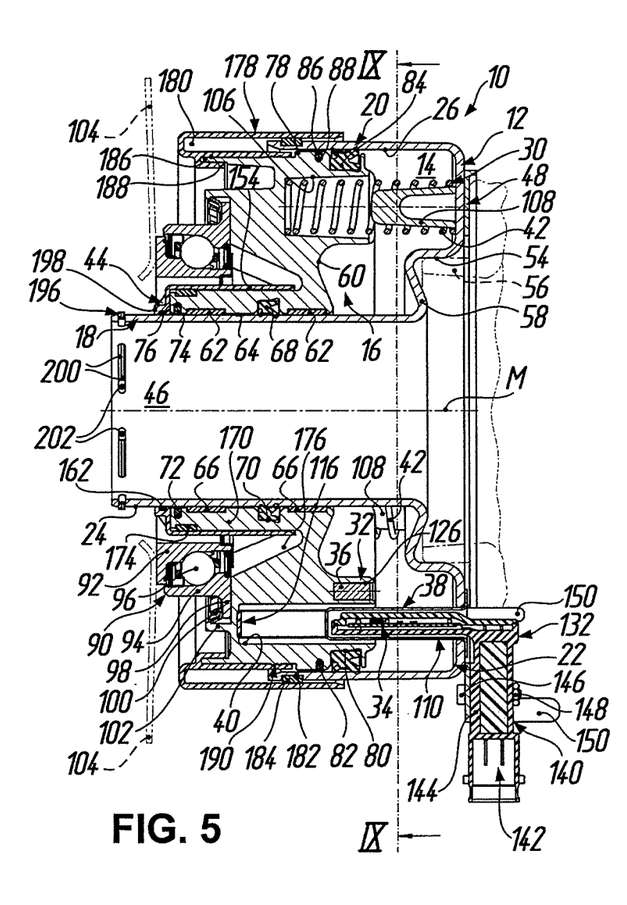
FIG. 5 shows a sectional view, on an enlarged scale in relation to FIG. 1, of the central release mechanism as per FIG. 1, with section profile and installation situation corresponding to FIG. 4, wherein the ring-shaped piston is, with respect to the cylinder housing, situated in a relative position which is assumed in the event of the initial actuation of the central release mechanism, and by means of which a release bearing borne by the ring-shaped piston comes into contact with the spring tongues of the diaphragm spring and the protective cap is transferred from its basic position into its operating position.

FIGS. 5 and 6 show, in various sectional views, a relative position of ring-shaped piston 16 and cylinder housing 12 which is assumed in the event of an initial actuation of the central release mechanism 10 with pneumatic pressurization of the ring-shaped piston 16 via the pressure chamber 14. Here, the release bearing 90, which is borne by the ring-shaped piston 16, has come into contact with the spring tongues 104 of the diaphragm spring of the clutch (not otherwise illustrated), wherein the protective cap 44 has, overcoming the static friction at the O-ring 76, been displaced on the inner piston running surface 24 into its operating position, in which the protective cap 44 at least partially surrounds the inner piston running surface 24 with protective action. In this position, there is force equilibrium on the ring-shaped piston 16, which in these figures is acted on with spring force from the left by the spring tongues 104 of the diaphragm spring via the release bearing 90 and is counteracted by frictional engagement via the O-ring 162 of the protective cap 44 on the inner piston running surface 24 and is acted on from the right pneumatically by means of the air pressure in the pressure chamber 14 of the cylinder housing 12 and with a spring force by means of the preload springs 42 of the preload spring arrangement 30 in the pressure chamber 14.

FIG. 7 shows the pneumatically unpressurized installation state of the central release mechanism 10, in which there is force equilibrium between the spring forces acting on the ring-shaped piston 16, that is to say the spring forces of the spring tongues 104 of the diaphragm spring of the clutch which act on the ring-shaped piston 16 from the left in this figure via the release bearing 90 are counteracted by the spring forces of the preload springs 42 of the preload spring arrangement 30 in the pressure chamber 14, which act on the ring-shaped piston 16 from the right in this figure. It can also be seen from FIG. 7 that the protective cap 44, after the initial actuation of the central release mechanism 10, remains in its operating position in which the protective cap 44 is in turn held by static friction via the O-ring 162 on the inner wall 18 of the cylinder housing 12. Accordingly, after the initial actuation of the central release mechanism 10, the protective cap 44 overlaps and protects an effective running region for the ring-shaped piston 16 on the inner piston running surface 24. During further actuations of the central release mechanism 10 out of this position, the ring-shaped piston 16 can slide by way of its felt ring 174 on the inner circumference of the shell portion 154 of the protective cap 44 which is held fixedly with respect to the housing.

A further functional position of the ring-shaped piston 16 on the inner piston running surface 24 of the cylinder housing 12 is shown by FIG. 8. This functional position may be assumed for example during dismounting of the transmission from the engine, when the central release mechanism 10, which is possibly still mounted on the transmission, has been removed from the clutch and thus from the spring tongues 104 of the diaphragm spring of the clutch.

Since, in this situation, the spring tongues 104 no longer counteract the ring-shaped piston 16 the preload springs 42 of the preload spring arrangement 30 in the pressure chamber 14 displace the ring-shaped piston 16 such that it abuts against the protective cap 44, which is initially still situated in its operating position on the inner piston running surface 24. If pneumatic pressurization of the pressure chamber 14 possibly occurs in this state, then the static friction between the O-ring 76 on the collar portion 152 of the protective cap 44 and the inner piston running surface 24 of the cylinder housing 12 is also overcome, and the protective cap 44 is displaced on the inner piston running surface 24 further away from the base 22 of the cylinder housing 12. This movement comes to an end only when the protective cap 44 which has been displaced by means of the ring-shaped piston 16 comes into contact by way of its face surface 198 with the closest serrated ring 200 of the end stop 196, as shown in FIGS. 8 and 13. The end stop 196 thus secures the protective cap 44, and with the protective cap 44 also the ring-shaped piston 16, on the cylinder housing 12. Owing to these positively locking measures, the ring-shaped piston 16 and the protective cap 44 are held captively on the cylinder housing 12 at all times.

As can also be seen from a comparison of FIGS. 4, 5, 7 and 8, it is the case in all functional positions of the ring-shaped piston 16 in the cylinder housing 12 that the extension 38 of the cylinder housing 12 plunges into the associated aperture 40 in the ring-shaped piston 16, such that the ring-shaped piston 16 is at all times secured in an effective manner against rotation about the central axis M with respect to the cylinder housing 12.

It is finally also evident to a person skilled in the art that the position encoder 36 (that is to say in this case the permanent magnet) on the ring-shaped piston 16 and the position detector 34 of the sensor arrangement 32 on the cylinder housing 12 remain angularly in overlap with respect to the central axis M in all functional positions of the ring-shaped piston 16 in the cylinder housing 12, such that the magnetic field of the position encoder 36 can always be detected in an effective manner and evaluated with regard to the stroke of the ring-shaped piston 16 in the cylinder housing 12—in a manner known per se—by means of the Hall element 128 of the position detector 34. Any tilting of the ring-shaped piston 16 with respect to the cylinder housing 12 as a result of radial play is not detrimental to a high level of detection accuracy of the sensor arrangement 32, because the relative movement caused by this between position encoder 36 and position detector 34 is only very slight owing to the short radial spacing of the sensor arrangement 32, in particular of the position encoder 36, with respect to the central axis M (short lever arm).

A central release mechanism for a pneumatic clutch actuating means has a cylinder housing, which, about a central axis, delimits a ring-shaped pressure chamber in which a ring-shaped piston which can be pneumatically pressurized via the pressure chamber and which is operatively connectable to a clutch is guided so as to be displaceable along the central axis. Here, in the pressure chamber, between the ring-shaped piston and a base of the cylinder housing, there is provided a preload spring arrangement which braces the ring-shaped piston and the cylinder housing apart from one another. A movement of the ring-shaped piston relative to the cylinder housing is detectable by means of a sensor arrangement which has a position detector and a position encoder. The preload spring arrangement has a multiplicity of preload springs which are distributed, so as to be angularly spaced apart from one another, about the central axis. Between the preload springs as viewed in a circumferential direction about the central axis, at least a part of the sensor arrangement is arranged in the region of the pressure chamber, such that, with high accuracy in the detection of the position of the ring-shaped piston relative to the cylinder housing, the central release mechanism is of very compact construction in particular in a radial direction.

LIST OF REFERENCE DESIGNATIONS

10 Central release mechanism
12 Cylinder housing
14 Pressure chamber
16 Ring-shaped piston
18 Inner wall
20 Outer wall
22 Base
24 Inner piston running surface
26 Outer piston running surface
28 Pressure port
30 Preload spring arrangement
32 Sensor arrangement
34 Position detector
36 Position encoder
38 Extension
40 Aperture
42 Preload spring
44 Protective cap
46 Passage
48 Fastening flange
50 Fastening lug
52 Fastening bore
54 Shoulder
56 Fastening flange
58 Connecting portion
60 Aperture
62 Slide ring
64 Inner circumferential surface
66 Radial groove
68 Sealing element
70 Radial groove
72 Radial groove
74 Stripper ring
76 O-ring
78 Outer circumferential surface
80 Radial groove
82 Radial groove
84 Sealing element
86 Stripper ring
88 O-ring
90 Release bearing
92 Inner ring
94 Outer ring
96 Rolling body
98 Ring-shaped collar
100 Angular spring element
102 Ring-shaped web
104 Spring tongue
106 Aperture
108 Guide projection
110 Sleeve
112 Opening
114 Collar
116 Insert part
118 Snap-action connection
120 Snap-action hook
122 Groove
124 Spring tongue
126 Aperture
128 Hall element
130 Circuit board
132 Sensor housing
134 Main body
136 Cavity
138 Cover
140 Connector portion
142 Plug connector
144 Flange region
146 Cylinder screw
148 Nut
150 Protective tab
152 Collar portion
154 Shell portion
156 Base portion
158 Stop surface
160 Face surface
162 O-ring
164 Radial groove
166 Rib
168 Aperture
170 Piston extension
172 Radial groove 174 Felt ring
176 Ring-shaped aperture
178 Protective cap
180 Ring-shaped chamber
182 Radial groove
184 Felt ring
186 Ring-shaped web
188 Ring-shaped aperture
190 Snap-action connection
192 Complementary contours
194 Oblique surfaces
196 End stop
198 Face surface
200 Serrated ring
202 Aperture
d Inner diameter
D Outer diameter
M Central axis

The invention claimed is:

1. A central release mechanism for a pneumatic clutch actuating means, comprising:
   a cylinder housing that delimits a ring-shaped pressure chamber having a central axis; and
   a ring-shaped piston that can be pneumatically pressurized via the pressure chamber and that is operatively connectable to a clutch, the piston being guided so as to be displaceable along the central axis, the movement of the piston relative to the cylinder housing being detectable with a sensor arrangement which has a position detector and a position encoder,
   wherein, in the pressure chamber, between the ring-shaped piston and a base of the cylinder housing, there is provided a preload spring arrangement which braces the ring-shaped piston and the cylinder housing apart from one another,
   wherein the preload spring arrangement has a multiplicity of preload springs which are distributed, so as to be angularly spaced apart from one another, about the central axis, and
   wherein, between the preload springs as viewed in a circumferential direction about the central axis, the sensor arrangement is arranged in the pressure chamber.

2. The central release mechanism according to claim 1, wherein the preload springs are angularly spaced apart from one another uniformly about the central axis.

3. The central release mechanism according to claim 1, wherein the preload springs are radially spaced apart from the central axis to the same extent.

4. The central release mechanism according to claim 1, wherein the ring-shaped piston has, on its side facing towards the pressure chamber, apertures in which the preload springs are received at one end, and guide projections are arranged on the base of the cylinder housing for the purposes of receiving the preload springs, the guide projections protrude into the pressure chamber.

5. The central release mechanism according to claim 1, wherein the multiplicity of preload springs comprises three preload springs are provided.

6. The central release mechanism according to claim 1, wherein the preload springs are helical compression springs.

7. The central release mechanism according to claim 1, wherein the cylinder housing has an extension which extends into the pressure chamber between the preload springs as viewed in the circumferential direction about the central axis and which is configured for receiving the position detector positionally fixedly with respect to the cylinder housing.

8. The central release mechanism according to claim 7, wherein the extension extends into the pressure chamber substantially parallel to the central axis, and plunges into an aperture of the ring-shaped piston, the aperture is arranged in the ring-shaped piston adjacent to the position encoder.

9. The central release mechanism according to claim 8, wherein the position encoder is situated in the ring-shaped piston at the inside in relation to the position detector in a radial direction as viewed with respect to the central axis.

10. The central release mechanism according to claim 7, wherein the extension of the cylinder housing is adapted to secure the ring-shaped piston against a rotation about the central axis with respect to the cylinder housing.

11. The central release mechanism according to claim 7, wherein the extension of the cylinder housing is formed by a cup-shaped sleeve, which is composed of a substantially non-magnetizable high-grade steel and which is preferably welded in a sealed manner to the cylinder housing.

12. The central release mechanism according to claim 7, wherein the extension of the cylinder housing is slidingly guided in the aperture of the ring-shaped piston.

13. The central release mechanism according to claim 1, wherein the base of the cylinder housing has an encircling shoulder, which extends substantially parallel to the central axis in the direction of the ring-shaped piston.

14. The central release mechanism according to claim 13, wherein the base of the cylinder housing has a connecting portion, which adjoins the shoulder radially at the inside, to an inner wall of the cylinder housing, which the connecting portion is set back radially inwards from radially outside with respect to the ring-shaped piston.

15. The central release mechanism according to claim 14, wherein the ring-shaped piston is equipped, on its side facing towards the pressure chamber, with a ring-shaped aperture which runs around the central axis and which, as viewed in cross section, has a contour complementary with respect to the connecting portion.

16. The central release mechanism according to claim 1, wherein the position encoder is situated in the ring-shaped piston at the inside in relation to the position detector in a radial direction as viewed with respect to the central axis.

* * * * *